US011853624B2

(12) United States Patent
Hattori

(10) Patent No.: US 11,853,624 B2
(45) Date of Patent: *Dec. 26, 2023

(54) METHOD FOR SWITCHING IMAGE FORMING APPARATUS, INFORMATION PROCESSING APPARATUS, AND SWITCHING SYSTEM

(71) Applicant: BROTHER KOGYO KABUSHIKI KAISHA, Nagoya (JP)

(72) Inventor: Yuka Hattori, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,897

(22) Filed: Jan. 16, 2023

(65) Prior Publication Data

US 2023/0153047 A1 May 18, 2023

Related U.S. Application Data

(63) Continuation of application No. 17/533,778, filed on Nov. 23, 2021, now Pat. No. 11,593,045.

(30) Foreign Application Priority Data

Nov. 27, 2020 (JP) .................................. 2020-197573

(51) Int. Cl.
*G06F 3/12* (2006.01)
(52) U.S. Cl.
CPC .......... *G06F 3/1229* (2013.01); *G06F 3/1204* (2013.01); *G06F 3/1219* (2013.01)

(58) Field of Classification Search
CPC .... G06F 3/1229; G06F 3/1204; G06F 3/1219; G06F 3/1285; G06Q 30/06
See application file for complete search history.

(56) References Cited

U.S. PATENT DOCUMENTS

2012/0254050 A1\* 10/2012 Scrafford .............. G06Q 10/00
705/318
2015/0363677 A1\* 12/2015 Nihei ................. G03G 15/0189
358/1.12

(Continued)

OTHER PUBLICATIONS

Notice of Allowance dated Oct. 14, 2022 from U.S. Appl. No. 17/533,778.

*Primary Examiner* — Helen Zong
(74) *Attorney, Agent, or Firm* — Scully, Scott, Murphy & Presser, PC

(57) ABSTRACT

A method includes an accepting step of causing an information processing apparatus to accept a request for switching a contracted device from a first image forming apparatus to a second image forming apparatus, the contracted device being an image forming apparatus allowed to use contracted consumables accommodating printing materials based on a contract, an enablement-establishing step of causing the information processing apparatus to establish a first enabled state in which the second image forming apparatus is allowed to use a contracted consumables, in response to acceptance of the request, and an enablement-continuing step of causing the information processing apparatus to establish a second enabled state in which the first image forming apparatus is allowed to continuously use the contracted consumables that has been previously used in the first image forming apparatus for a predetermined period, in response to acceptance of the request.

12 Claims, 7 Drawing Sheets

(56) References Cited

U.S. PATENT DOCUMENTS

2018/0131831 A1   5/2018  Tolia et al.
2020/0286052 A1*  9/2020  Tomida .............. H04N 1/00344
2022/0171583 A1*  6/2022  Suzuki ................. G06F 3/1235

* cited by examiner

METHOD FOR SWITCHING IMAGE FORMING APPARATUS, INFORMATION PROCESSING APPARATUS, AND SWITCHING SYSTEM

CROSS REFERENCE TO RELATED APPLICATION

The present application is a continuation application of U.S. Ser. No. 17/533,778 filed on Nov. 23, 2021 and claims priority from Japanese Patent Application No. 2020-197573, which was filed on Nov. 27, 2020, the disclosures of which are herein incorporated by reference in their entirety.

BACKGROUND

The following disclosure relates to a method for switching an image forming apparatus with which a contract was concluded, an information processing apparatus, and a switching system for the image forming apparatus.

There has been widely provided a fixed price printing service for a user of an image forming apparatus. The fixed price printing service is also called a subscription service, and each image forming apparatus can join the subscription service. For example, the image forming apparatus with which a contract related to uses of the fixed price service was concluded allows the user to print up to a predetermined number of prints in a predetermined period at the fixed price.

Generally, in the use of the fixed price service for the image forming apparatus, there are common cases in which a provider of the fixed price service designates that the user of the fixed price service should use contracted consumables dedicated to the fixed price service. In these cases, it is necessary to establish a system which secures that use of the contracted consumable in the contracted device is an appropriate use.

To secure the appropriate use of the contracted consumables, for example, there has been known a technique to distinguish between the contracted consumables and normal consumables which can be used regardless of joining the service. Moreover, there has been known a technique to manage to associate the contracted consumables with the contracted device such that the contracted consumables are used for the identified contracted device.

SUMMARY

Incidentally, the user can switch the contracted device to another device for various circumstances. Previously, switching of the contracted device is conducted as follows. For example, first, a procedure of cancellation of the contract with respect to an old pre-switched image forming apparatus (which may be hereinafter referred to as "old device") is conducted. Second, a new image forming apparatus (which may be hereinafter referred to as "new device") is delivered to the user. Third, a new contract to the new device is concluded. Fourth, the provider of the service provides the user with contracted consumables for the new device based on the concluded contract. That is, the user cannot use the fixed price service during a period from the time of the cancellation of the contract with the old device to the time of receiving the contracted consumables for the new device, accordingly, it leads to inconvenience.

Accordingly, an aspect of the disclosure relates to achieving a method for conveniently switching a contracted device by eliminating or reducing a period in which the service cannot be used.

An aspect of the disclosure relates to a method includes an accepting step of causing an information processing apparatus to accept a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, an enablement-establishing step of causing the information processing apparatus to establish a first enabled state in which the second image forming apparatus is allowed to use a contracted consumables, in response to acceptance of the request by the information processing apparatus, an enablement-continuing step of causing the information processing apparatus to establish a second enabled state in which the first image forming apparatus is allowed to continuously use the contracted consumables that has been previously used in the first image forming apparatus for a predetermined period, in response to acceptance of the request by the information processing apparatus.

In another aspect of the disclosure, an information processing apparatus includes a controller. The controller is configured to execute an accepting process of accepting a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, an enablement-establishing process of establishing a first enabled state in which the second image forming apparatus is allowed to use a contracted consumables, in response to acceptance of the request, and an enablement-continuing process of establishing a second enabled state in which the first image forming apparatus is allowed to continuously use the contracted consumables that has been previously used in the first image forming apparatus for a predetermined period, in response to acceptance of the request.

In another aspect of the disclosure, a system includes a first image forming apparatus allowed as a contracted device to use contracted consumables accommodating printing materials based on a concluded contract, a second image forming apparatus with which the contract is newly concluded, a server configured to communicate with the first image forming apparatus and the second image forming apparatus via a communication network, a user terminal of a user of the first image forming apparatus and the second image forming apparatus via the communication network, and an information processing apparatus constituted by at least one of the first image forming apparatus, the second image forming apparatus, the server and the user terminal. The information processing apparatus is configured to execute a accepting process causing an information processing apparatus to accept a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, an enablement-establishing process of causing the information processing apparatus to establish a first enabled state in which the second image forming apparatus is allowed to use a contracted consumables, in response to acceptance of the request by the information processing apparatus, and an enablement-continuing process of causing the information processing apparatus to establish a second enabled state in which the first image forming apparatus is allowed to continuously use the contracted consumables that has been previously used in the first image forming apparatus for a predetermined period, in response to acceptance of the request by the information processing apparatus.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

There will be described embodiments of the present disclosure in detail with reference to FIG. 1 to FIG. 7. In the embodiment, as an example, there will be described an ink-jet printer that is an image forming apparatus. However, an image forming apparatus 1 may be another printer other than the ink-jet printer. For example, the image forming apparatus 1 may be a laser printer.

Outline of Image Forming System

Figure 1:
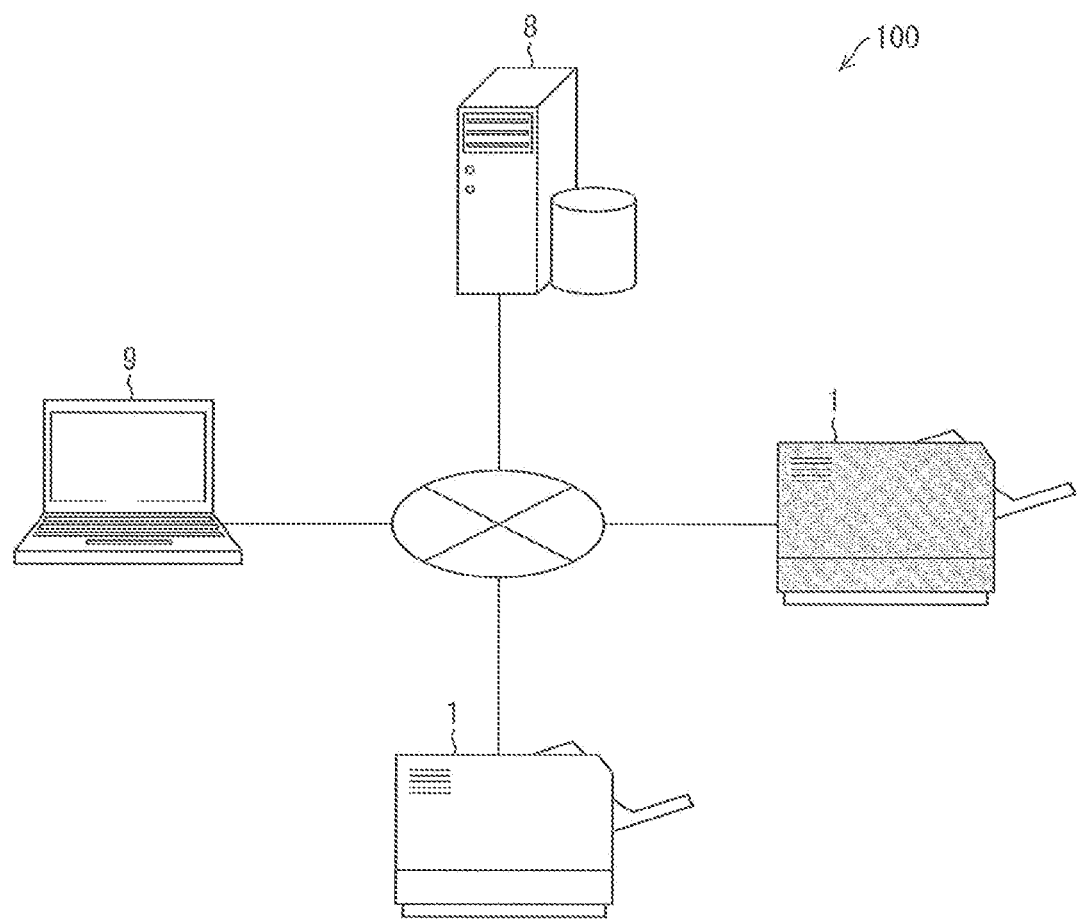
FIG. 1 is a schematic view illustrating an image forming system according to an embodiment of the present disclosure.

FIG. 1 is a view illustrating an outline of an image forming system 100 according to an embodiment of the present disclosure. In the image forming system 100, the image forming apparatus 1 is provided with printing service from a provider based on a contract concluded between the provider and a user of the image forming apparatus 1. Hereinafter, fixed price printing service provided based on the contract will be referred to as a contracted service. Moreover, printing executed by the image forming apparatus 1 by using the provided contracted service will be referred to as contracted printing, which is distinguished from printing executed normally and does not relate to the contract. The printing executed normally and does not relate to the contract will be referred to as normal printing.

As illustrated in FIG. 1, the image forming system 100 is configured to include a plurality of image forming apparatuses 1, a server 8, and a user terminal 9. The image forming apparatus 1 used by a user is a device that uses the contracted service to execute printing. The server 8 used by the provider of the contracted printing is a device that manages the image forming apparatus 1 with which the contract was concluded and is allowed to use the contracted service. Hereinafter, the image forming apparatus 1 with which the contract was concluded allowed to use the contracted service will be referred to as a contracted device. The user terminal 9 used by the user is a device that executes conclusion of the contract, cancellation of the contract, and other procedures by communicating with the server 8. For example, an information processing terminal with a standard communication function, such as a PC (a Personal Computer) and a smart phone, can be adopted as the user terminal 9. Each of the devices constituting the image forming system 100 can communicate with one another via a communication network such as the Internet.

The plurality of image forming apparatuses illustrated in FIG. 1 represent the image forming apparatuses 1 bought by the same user. Though not illustrated in FIG. 1, the image forming system 100 may be configured to include another image forming apparatus bought by another user.

Each of the plurality of image forming apparatuses 1 is an image forming apparatus allowed to use consumables or exchange parts dedicated to the contract when the user concludes the contract with the provider of the contracted printing. The contract means that, as an example, an agreement in which the provider provides the contracted service with the user is agreed by the provider that provides the contracted service and the user, under an agreement in which a period of the contracted service, a subscription fee of the contracted service, an upper limit of the number of prints and the like are agreed by the user and the provider. That is, the image forming apparatus 1 of the present embodiment is an image forming apparatus that is allowed to execute the contracted printing which is printing based on the content of the contract after conclusion of the contract.

In the image forming system 100, a timing A and a timing B, each of which will be described below, may be different from each other in the contracted service provided from the provider to the user.

The timing A is a timing when the server 8 identifies the image forming apparatus 1 as the contracted device with which the contract was concluded. The timing B is a timing when the server 8 identifies that the contracted service is started to use in the image forming apparatus 1. That is, in the contracted service, the server 8 may identify that the server 8 identifies the image forming apparatus 1 that is the contracted device and has not started the contracted service to use.

It is noted that identifying the image forming apparatus 1 as the contracted device with which the contract was concluded by the server 8 at the timing A may be executed in response to switching from a not-contracted mode indicating that the image forming apparatus 1 an image forming apparatus with which the contract was not concluded yet to a contracted mode indicating that the image forming apparatus 1 is an image forming apparatus with which the contract was concluded.

Moreover, identifying that the image forming apparatus 1 has started to use the contracted service at the timing B means that the server 8 identifies that the contracted service has been started in the image forming apparatus 1 since certain timing. Accordingly, the timing when the server 8 identifies that the contracted service has been started to use in the image forming apparatus may be different from a timing when the image forming apparatus 1 actually started to execute the contracted printing.

In the following description, unless there is a special description, the contracted service is a pay service. The timing A is the timing when the server 8 identifies the image forming apparatus 1 as the contracted device, and is not a trigger of start of charging. The timing B is a timing of start of charging.

In another modification, the timing A and the timing B may be nearly the same timing. As an example, mounting of an ink cartridge dedicated to the contracted service and used in the contracted printing on the image forming apparatus 1 may trigger the timing A and the timing B. In the following description, the ink cartridge dedicated to the contracted service and used in the contracted printing will be referred to as a contracted cartridge (contracted consumables). For example, the image forming apparatus 1 reads predetermined information from a cartridge memory of the contracted cartridge which has been mounted, and transmits the predetermined information to the server 8. The server 8 which has received the predetermined information from the image forming apparatus 1 identifies the image forming apparatus 1 as the contracted device and identifies that the contracted service is started to use in the image forming apparatus 1.

In the present embodiment, as an example, there will be described that the image forming apparatus 1 is an ink-jet printer configured to eject ink (printing materials) to print data on the recording sheet. One or more ink cartridges are mounted on a body housing of the image forming apparatus 1. In the present embodiment, as an example, the ink cartridges of four colors, cyan (C), magenta (M), yellow (M) and black (B), are mounted on the image forming apparatus 1. It is noted that a display, such as a liquid crystal display and a lamp, and an input unit, such as buttons, which are not illustrated, may be provided for the image forming apparatus 1. Moreover, the liquid crystal display integrated with a touch panel may be configured to function as the input unit.

In the embodiment illustrated in FIG. 1, one of the image forming apparatuses 1 indicates a current-contracted device with which the contract was concluded, and the other of the image forming apparatuses 1 indicates another image forming apparatus 1 with which the contract will be newly concluded in place of the image forming apparatus 1 as the current-contracted device. In the following description, switching the contracted device with which the contract was concluded from the current-image forming apparatus 1 to said another image forming apparatus 1 will be referred to as "switching the contracted device". Moreover, the image forming apparatus 1 as the current-contracted device will be referred to as "a pre-switched image forming apparatus 1" or "an old device" (as an example of a first image forming apparatus). Said another image forming apparatus 1 with which the contract will be newly concluded or said another image forming apparatus 1, in place of the pre-switched image forming apparatus 1, with which the contract is newly concluded will be referred to as "a post-switched image forming apparatus 1" or "a new device" (as an example of a second image forming apparatus). In a case where there is no need to distinguish between the pre-switched image forming apparatus 1 and the post-switched image forming apparatus 1, and explaining common features to each of the pre-switched image forming apparatus 1 and the post-switched image forming apparatus 1, the image forming apparatus 1 will be merely described.

Overall Configuration of Image Forming Apparatus

Figure 2:
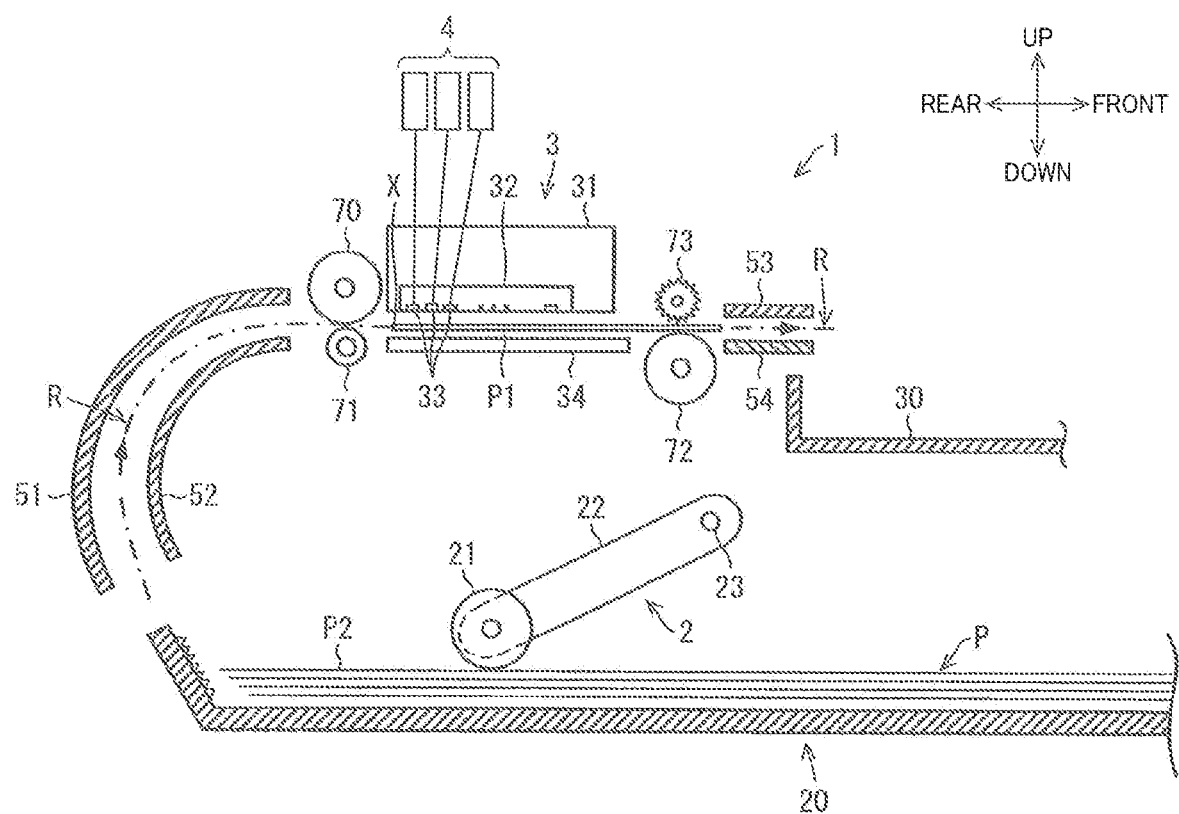
FIG. 2 is a schematic view illustrating a configuration of an image forming apparatus according to the present embodiment of the present disclosure.

FIG. 2 is a view illustrating an overall configuration of the image forming apparatus 1 in the present embodiment. For convenience, in the following description, an upper side in FIG. 2 is defined as an upper side of the image forming apparatus 1, a lower side in FIG. 2 is defined as a lower side of the image forming apparatus 1, a left side in FIG. 2 is defined as a rear side of the image forming apparatus 1, and a right side in FIG. 2 is defined as a front side of the image forming apparatus 1.

The image forming apparatus 1 is an ink-jet printer configured to print data on a recording sheet P by ejecting ink. One or more ink cartridges are mounted on the body housing of the image forming apparatus 1. It is noted that, other than parts illustrated in FIG. 2, a display, such as a liquid crystal display and a lamp, and an input unit, such as buttons may be provided for the image forming apparatus 1. Moreover, the liquid crystal display integrated with a touch panel may be configured to function as the input unit.

In the embodiment illustrated in FIG. 2, the image forming apparatus 1 includes a supply tray 20, a supplier 2, a conveying roller 70, a recorder 3, a discharging roller 72, and a discharge tray 30. An opening is formed on a front surface of the image forming apparatus 1. The supply tray 20 is disposed at the opening so as to be movable in a front and rear direction. A plurality of recording sheets P stacked on one another are accommodated in the supply tray 20. The recording sheet P is, for example, a paper sheet having a predetermined size. The recording sheet P is not limited to a paper medium. For example, the recording sheet P may be resin materials such as an overhead transparency film.

The supplier 2 includes a supplying roller 21, a supply arm 22 and a shaft 23. The supplier 2 supplies the recording sheet P accommodated in the supply tray 20 to a conveyance path R by rotation of the supplying roller 21 in a clockwise direction. The supplying roller 21 is rotatably provided at a distal end of the supply arm 22. The supply arm 22 is rotatably provided at the shaft 23 supported by a frame of the image forming apparatus 1. The supply arm 22 is rotationally urged toward the supply tray 20 by own weight or an elastic force by a spring and the like. Driving force by rotation of a motor (which is not illustrated) provided for the image forming apparatus 1 in a counterclockwise direction is transmitted to the supplying roller 21 such that the supplying roller 21 rotates in the clockwise direction.

The conveyance path R is a path defined by a guide member 51, a guide member 52, the recorder 3, a guide member 53, a guide member 54 and the like.

The conveying roller 70 is disposed upstream of the recorder 3 in the conveying direction. A pinch roller 71 is disposed so as to be opposed to a lower portion of the conveying roller 70. The conveying roller 70 rotates by driving force of the motor of the image forming apparatus 1. The pinch roller 71 rotates by rotation of the conveying roller 70. The recording sheet P is conveyed to an image recording position X of the conveyance path R by rotations of the conveying roller 70 and the pinch roller 71 in the clockwise direction in a state in which the recording sheet P is nipped between the conveying roller 70 and the pinch roller 71. The image recording position X is a position at which recording of an image on the recording sheet P by a recording head 32 is executed. When driving force by rotation of the motor of the image forming apparatus 1 in the in the clockwise direction is transmitted to the conveying roller 70, the conveying roller 70 rotates in the clockwise direction. Moreover, when driving force by rotation of the motor in the counterclockwise direction is transmitted to the conveying roller 70, the conveying roller 70 rotates in the counterclockwise direction. It is noted that rotation of the motor provided for the image forming apparatus 1 in the clockwise direction corresponds to a rotation in a first direction, and rotation of the motor in the counterclockwise direction corresponds to rotation in a second direction.

The recorder 3 is disposed between the conveying roller 70 of the conveyance path R and the discharging roller 72. The recorder 3 includes a carriage 31, the recording head 32, a plurality of nozzles 33, and a platen 34. Moreover, the plurality of nozzles 33 are connected to each of the ink cartridges 4. It is noted that the number of the plurality of nozzles 33 and the number of the ink cartridges 4 are not limited to the number of the present embodiment.

Each of the ink cartridges 4 includes a cartridge housing. The cartridge housing is mountable on the body housing of the image forming apparatus 1. The ink cartridges 4 accommodate ink of, for example, cyan, magenta, yellow, and black, different from one another, as materials used when forming images. Ink is consumables consumed in each printing.

The carriage 31 reciprocates in a direction orthogonal to the conveying direction, that is, a width direction of the recording sheet P. In image recording on the recording sheet P, as a printing process, the image forming apparatus 1 ejects ink from the plurality of nozzles 33 of the recording head 32 so as to record an image corresponding to one line by moving the carriage 31 in the width direction of the recording sheet P in a state in which conveyance of the recording sheet P is stopped. Moreover, as a new-line process, the image forming apparatus 1 conveys the recording sheet P by a predetermined conveyance amount by driving the conveying roller 70 and the discharging roller 72. The image forming apparatus 1 repeats the recording process and the new-line process.

As illustrated in FIG. 2, the recording head 32 is mounted on the carriage 31. The plurality of nozzles 33 are provided on a lower surface of the recording head 32. The recording head 32 ejects ink droplets from the plurality of nozzles 33. The platen 34 is a plate-like member having a rectangular shape on which the recording sheet P is placed. In a process in which the carriage 31 moves with respect to the recording sheet P supported by the platen 34, an image is recorded on the recording sheet P by selective ejections of ink by the recording head 32.

The discharging roller 72 is disposed downstream of the recorder 3 in the conveying direction. A spur 73 is disposed at a position opposed to an upper part of the discharging roller 72. The discharging roller 72 is driven by the motor provided for the image forming apparatus 1. The spur 73 rotates by rotation of the discharging roller 72. The recording sheet P is discharged to the discharge tray 30 in a state in which the sheet P is nipped between the discharging roller 72 and the spur 73 by rotation of the discharging roller 72 and the spur 73 in the clockwise direction.

The discharge tray 30 is disposed above the supply tray 20. The discharge tray 30 supports the recording sheet P discharged by the discharging roller 72.

Internal Configuration of Image Forming Apparatus, Ink Cartridges, and Server

Figure 3:
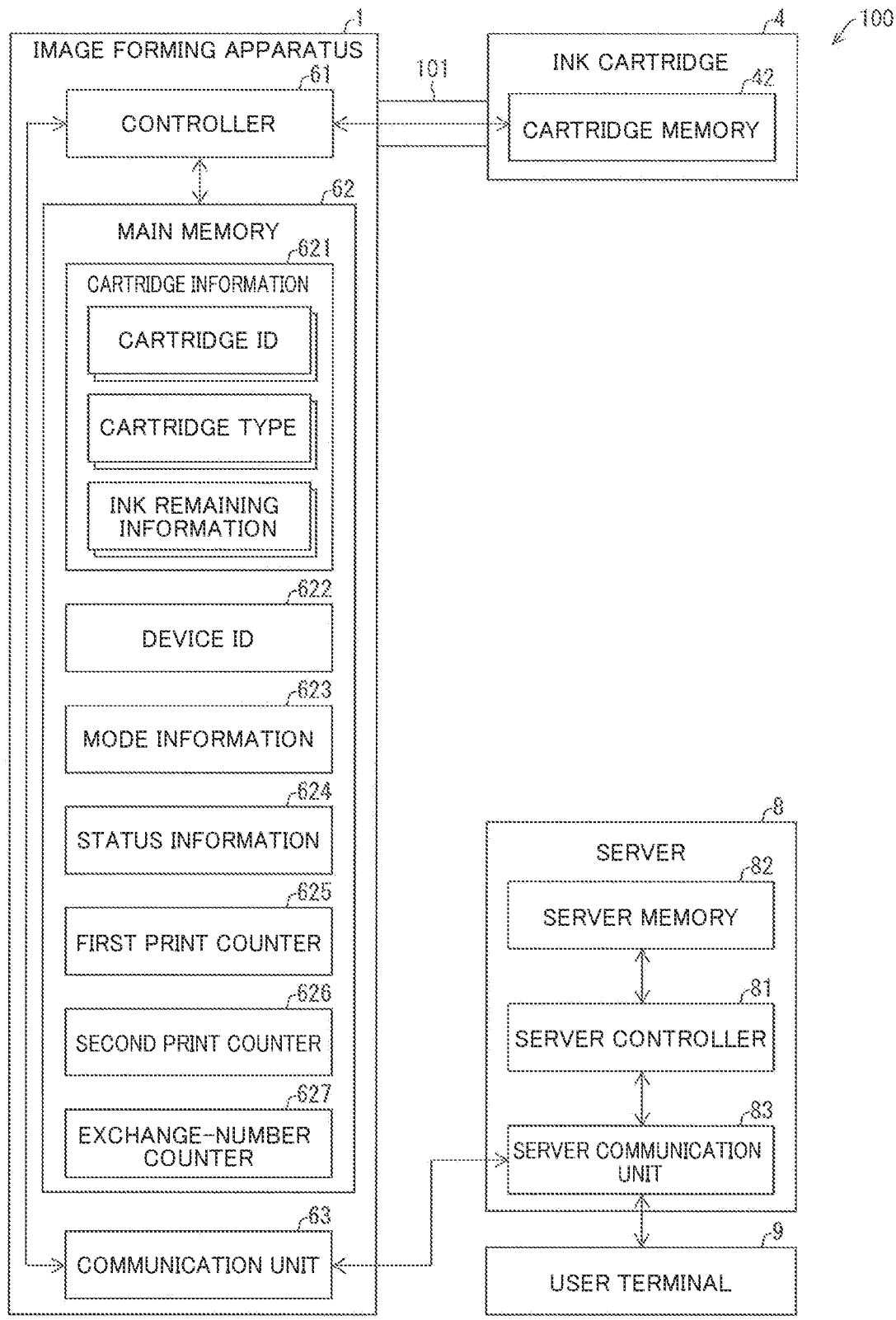
FIG. 3 is a block diagram illustrating essential parts of the image forming apparatus, an ink cartridge, and a server according to the present embodiment of the present disclosure.

FIG. 3 is a block diagram illustrating an essential configuration of the image forming apparatus 1, the ink cartridges 4, and the server 8.

Ink Cartridges

Each of the ink cartridges 4 includes a cartridge memory 42 (a consumable memory). The cartridge memory 42 is a memory from which information is readable and to which information is writable. The cartridge memory 42 is, for example, a flash ROM (Read Only Memory) or an EEPROM (Electrically Erasable Programmable ROM). The EEPROM is a registered trademark.

The cartridge memory 42 includes at least one storage area, for example, a first area to a fifth area to store information related to the ink cartridge 4. There will be described in details a data structure of the cartridge memory 42 with reference to FIG. 4.

The body housing of the image forming apparatus 1 includes a connector 101. In a state in which the ink cartridge 4 is mounted on the body housing of the image forming apparatus 1, the connector 101 is electrically connected to the cartridge memory 42. As a result, a controller 61 of the image forming apparatus 1 becomes capable of communicating with the cartridge memory 42 of each of the ink cartridges 4.

Image Forming Apparatus

The image forming apparatus 1 includes the controller 61, a main memory 62 and a communication unit 63. The controller 61 includes, for example, ASIC (Application Specific Integrated Circuit). The controller 61 is electrically connected to the main memory 62 and the communication unit 63 provided at the body housing of the image forming apparatus 1. The controller 61 causes the image forming apparatus 1 to execute various processes relating to printing by executing various operations.

It is noted that the controller 61 may include a processor such as a CPU (Central Processing Unit). In this case, a controlling program configured to execute a controlling method of the image forming apparatus 1 is stored into the main memory 62, and the controller 61 may cause the image forming apparatus 1 to execute various processes by operations of the processor in accordance with the controlling program.

Moreover, the controller 61 may include a recording medium, such as the main memory 62, storing the controlling program and readable by a computer. As the recording medium, a tangible non-transitory medium, for example, a ROM, a tape, a disk, a card, a semiconductor memory, a programmable logic circuit, and the like can be used. Moreover, a RAM (Random Access Memory) which expands the controlling program may be used. The controlling program may be provided to the computer via arbitrary transmission media capable of transmitting the controlling program (such as a communication network and a broadcast wave). It is noted that one embodiment of the present disclosure can be achieved as a form of data signals in which the controlling program is embodied and embedded in a carrier wave.

As illustrated in FIG. 3, when the ink cartridge 4 is mounted on the image forming apparatus 1, the ink cartridge 4 is electrically connected to the controller 61. Accordingly, the controller 61 becomes executable for a reading process of reading information from the cartridge memory 42 and a writing process (including a rewriting process) of writing information into the cartridge memory 42.

The main memory 62 is a memory from which information is readable and to which information is writable. The main memory 62 is, for example, a flash ROM or an EEPROM. The EEPROM is a registered trademark. The main memory 62 includes one or more storage areas, and, as an example, various kinds of information described below are stored in each of the one or more storage areas.

Cartridge information 621 is information related to each of the ink cartridges 4 of each color mounted on the image forming apparatus 1. Specifically, the cartridge information 621 includes information read from the cartridge memory 42 of each of the ink cartridges 4 and associated with a corresponding one of the ink cartridges 4. As illustrated, the information related to the ink cartridge 4 is, as an example, a cartridge ID, a cartridge type, the remaining amount of ink, and the like. In the present embodiment, the information related to the ink cartridge 4 further includes status information indicating a status of each of the ink cartridges 4. The details of the data structure of the cartridge information 621 will be described below with reference with FIG. 4.

In the present embodiment, the cartridge information 621 read from the cartridge memory 42 is referred so as to precisely determine the status of the ink cartridge 4 by the controller 61. The controller 61 can execute a proper process to the ink cartridges 4 at the timing of switching of the contracted device by precisely obtaining the status of the ink cartridges 4. Moreover, in the present embodiment, the cartridge information 621 may be referred so as to determine by the controller 61 whether switching to the contracted mode is proper or not in accordance with a mount-status of each of the ink cartridges 4 on the image forming apparatus 1. The contracted mode is one of operation modes of the image forming apparatus 1 in which the image forming apparatus 1 is identified as the contracted device having a qualification for executing the contracted printing based on the contract in the image forming system 100.

A device ID 622 is identification information for identifying the image forming apparatus 1. The device ID 622 is, for example, a serial number of the image forming apparatus 1.

Mode information 623 is information indicating the operation mode of the image forming apparatus 1. In the present embodiment, as an example, two modes "the contracted mode" and "the not-contracted mode" are defined. "The contracted mode" means that the image forming apparatus 1 operates as the contracted device with which the contract was concluded in the image forming system 100. "The not-contracted mode" means that the image forming apparatus 1 is not the contracted device, and operates a normal image forming apparatus with which the contract was not concluded.

In the shipping of the image forming apparatus 1, the mode information 623 indicating a value corresponding to the not-contracted mode as a default setting is stored in the main memory 62. The server 8 transmits a request including a contract-switching-instruction for instructing switching to the contracted mode to the image forming apparatus 1 of the user who concluded the contract with the provider. The controller 61 switches the mode information 623 from the not-contracted mode to the contracted mode in accordance with the request from the server 8. In the present embodiment, as an example, switching the value of the mode information 623 from the not-contracted mode to the contracted mode by the controller 61 is referred to as "switching to the contracted mode".

In another embodiment, the mode information 623 may indicate whether the image forming apparatus 1 is the contracted mode or the not-contracted mode, and further indicate whether the image forming apparatus 1 is a non-billing status or a billing status under the contracted mode in a case where the image forming apparatus 1 is the contracted mode. That is, the mode information 623 may be stored in the main memory 62 as information indicating that the image forming apparatus 1 is one of three statuses including (i) the not-contracted mode, (ii) the non-billing status under the contracted mode, or (iii) the billing status under the contracted mode.

"the non-billing status under the contracted mode" indicates that the image forming apparatus 1 is the contracted mode, and the image forming apparatus 1 does not start use of the contracted service. For example, as described above, in a case where there is a difference between the timing when the server 8 identifies the image forming apparatus 1 as the contracted device and the timing when the server 8 identifies that the image forming apparatus 1 starts use of the contracted service, "the non-billing status under the contracted mode" can occur.

On the other hand, "the billing status under the contracted mode" indicates a status in which the image forming apparatus 1 is the contracted mode, and use of the contracted service has been started.

Status information 624 is information indicating a status of the image forming apparatus 1. In the present embodiment, as an example, the status information 624 may include an abnormal flag indicating whether the image forming apparatus 1 is in a normal condition or an abnormal condition, and error information indicating content of the error in a case where the status of the image forming apparatus 1 is in the abnormal condition. The controller 61 can determine whether failure occurs in the image forming apparatus 1 or not by referring to the status information 624.

A first print counter 625 is the total number of prints in the image forming apparatus 1. A second print counter 626 indicates the number of prints printed by using the contracted service in the image forming apparatus 1. The second print counter 626 may be count-reset to zero each time when the image forming apparatus 1 is switched from the not-contracted mode to the contracted mode, and may be the total number of prints printed by using the contracted service in the image forming apparatus 1 until now. In the following description, unless there is a specific description, the value of the second print counter 626 is the total number of prints printed in the image forming apparatus 1 that is executed as the contracted printing until now.

An exchange-number counter 627 indicates the number of exchanges of the contracted cartridge to a new contracted cartridge. The controller 61 execute one increment of the number of exchanges of the exchange-number counter 627 when a new contracted ink cartridge 4 is mounted on the body housing of the image forming apparatus 1.

The main memory 62 may include, for example, an area for storing the total number of prints in the image forming apparatus 1 in addition to the above described information.

The communication unit 63 executes, for example, communication between the image forming apparatus 1 and the server 8 via a communication network such as Internet. The communication unit 63 outputs the request received from the server 8 to the controller 61. Here, "the request" indicates various requests, instructions, inquiries and the like transmitted from the server 8 in contract-related processes. The controller 61 calculates a result in response to the request, and the communication unit 63 returns the result output from the controller 61 to the server 8 as "a response". In the present embodiment, the return of the response by the communication unit 63 may be omitted. For example, in a case where the request is an instruction for changing various settings in the image forming apparatus 1, the controller 61 changes the various settings in the image forming apparatus 1 in accordance with the instruction. However, return of a notification indicating that the various settings have been changed to the server 8 via the communication unit 63 may be omitted.

Server

The server 8 comprises a server communication unit 83, a server memory 82, and a server controller 81 (as an example of a controller). The server communication unit 83 is a communication interface configured to execute communication between the server 8 and the image forming apparatus 1. The server communication unit 83 transmits the request input from the server controller 81 to the image forming apparatus 1. The server communication unit 83 receives a response transmitted, from the image forming apparatus 1, in accordance with the transmitted request, and outputs to the server controller 81.

Moreover, the server communication unit 83 communicates with the user terminal 9 operated by the user of the image forming apparatus 1 via the communication network so as to transmit information to and receive information from the user terminal 9. In the present embodiment, the server communication unit 83 transmits various kinds of information that is necessary for conclusion of the contract to the user terminal 9, and receives the various kinds of information from the user terminal 9. Specifically, the server communication unit 83 may receive, from the user terminal 9, a contract requesting message which requests for conclusion of the contract. The contract requesting message may include the device ID 622 that identifies the image forming apparatus 1. After the server controller 81 executes the contract-related processes in response to the contract requesting message, the server communication unit 83 may transmit a notification indicating that the server 8 identifies the image forming apparatus 1 as the contracted device to the user terminal 9.

The server memory 82 is a storage device storing data necessary for operations of the server 8. The server memory 82 stores device information for each of the image forming apparatuses 1 which joined the contracted service provided for the image forming system 100. The device information may include, for example, a device ID, a contract flag, a contracted-upper-limit of the number of prints, the model number, the date of manufacture of the image forming apparatus 1, and the like.

The device ID 622 is identification information for uniquely identifying the image forming apparatus 1 by the server 8. The contract flag is information indicating whether the image forming apparatus 1 is switched to the contracted mode or not, that is, whether the server 8 identifies the image forming apparatus 1 as the contracted device or not. The contracted-upper-limit of the number of prints indicates that an upper-limit of the number of prints for the contracted printing printable by the image forming apparatus 1 in a predetermined period determined by the contract.

The server controller 81 is a CPU configured to comprehensively control the server 8. The server controller 81 generates the request for the image forming apparatus 1 at a predetermined timing, and outputs the generated request to the server communication unit 83. In the present embodiment, the request includes, for example, the contract-switching-instruction for instructing the image forming apparatus 1 to switch to the contracted mode. The server controller 81 controls the server communication unit 83 to transmit the contract-switching-instruction to the image forming apparatus 1 which is a subject device of a request from the user in response to receipt of the contract requesting message transmitted from the user terminal 9.

Moreover, the server controller 81 causes the server memory 82 to newly store the device information based on a response received from the image forming apparatus 1 via the server communication unit 83, and renew the stored device information. More specifically, for example, when the server communication unit 83 receives, from the user terminal 9, the contract requesting message related to the image forming apparatus 1 which is a subject device for a new conclusion of the contract requested by the user, the server controller 81 newly registers the device information of the image forming apparatus 1 into the server memory 82. At this time, the server controller 81 sets the contract flag to a value indicating "unidentified" as an initial value. The contract flag "unidentified" means that the server 8 does not identify yet that the image forming apparatus 1 which is going to execute the contracted printing is switched to the contracted mode, even if the contract between the user and the provider was concluded. Then, when the server 8 identifies via communication with the image forming apparatus 1 that the image forming apparatus 1 is switched to the contracted mode, the server controller 81 renews the contract flag of the image forming apparatus 1 so as to be set to a value indicating "identified". Based on these processes, the image forming apparatus 1 is identified as the contracted device in the image forming system 100 including the server 8.

Data Structure

Figure 4:
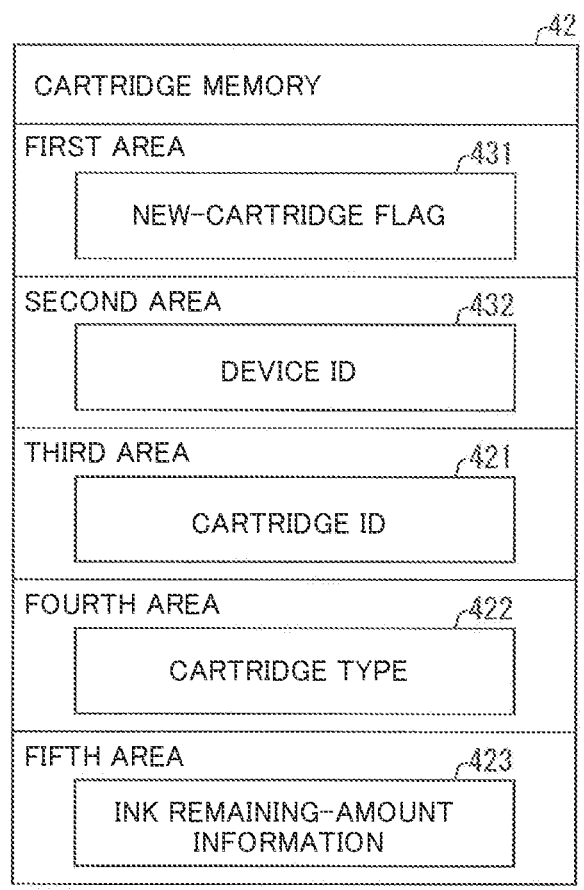
FIG. 4 is a diagram illustrating a data structure of a cartridge memory.

FIG. 4 is a diagram illustrating a data structure of the cartridge memory 42 of each of the ink cartridges 4. The cartridge memory 42 includes, as an example, five storage areas, at least the first area to the fifth area.

The first area is a storage area for storing the status information. The status information is information indicating whether the ink cartridge 4 is a new-cartridge or an old-cartridge, as an example, the status information is a new-cartridge flag 431. For example, the value "1" of the new-cartridge flag 431 may mean that the ink cartridge 4 is a new, and the value "0" of the new-cartridge flag 431 may mean that the ink cartridge 4 is old.

A second area is a storage area for storing a device ID 432 of the associated image forming apparatus 1, in a case where the ink cartridge 4 is an old cartridge.

A cartridge ID 421 may be stored in a third area. The cartridge ID 421 is, for example, a unique serial number for identifying the ink cartridge 4 individually. The cartridge ID 421 may include the color, the model number, the manufacture, and the production lot of the ink cartridge 4, and the like.

A cartridge type 422 may be stored in a fourth area. The cartridge type 422 is information indicating a type of the ink cartridge 4. In the present embodiment, at least two types, "contracted" and "commercial" can be set as the types of the ink cartridge 4.

The ink cartridge 4 to which the type "contracted" is set, in the fourth area, is an ink cartridge dedicated to the contracted service. In the following description, this type of the ink cartridge will be referred to as a contracted cartridge. The image forming apparatus 1 can execute the contracted printing while mounting the contracted cartridge on the image forming apparatus 1. The contracted cartridge is provided from the provider to the user who concluded the contract to the image forming apparatus 1.

The ink cartridge 4 to which the type "commercial" is set, in the fourth area, is an ink cartridge that is a commercial cartridge purchasable at a mass home electrical retailer or a mail order site. In the following description, this type of the ink cartridge will be referred to as a commercial cartridge. The commercial cartridge may be a genuine product manufactured by the manufacturer of the image forming apparatus 1, and may be a compatible product, i.e., a third product, manufactured by a third party other than the manufacture of the image forming apparatus 1.

Ink remaining-amount information 423 may be stored in the fifth area. The ink remaining-amount information 423 is information indicating a remaining amount of ink of the ink cartridge 4. The remaining amount of ink is constituted by, as an example, values respectively corresponding to a plurality of stage from full of ink to empty, and the values is stored in the fifth area. Respective stages of the remaining amount of ink may be notified by words of "FULL" to "EMPTY" to the user, may be notified by numerals of "100%" to "0%" to the user, and may be notified by expressions combining the words and the numerals to the user.

Flow of Processes

Figure 5:
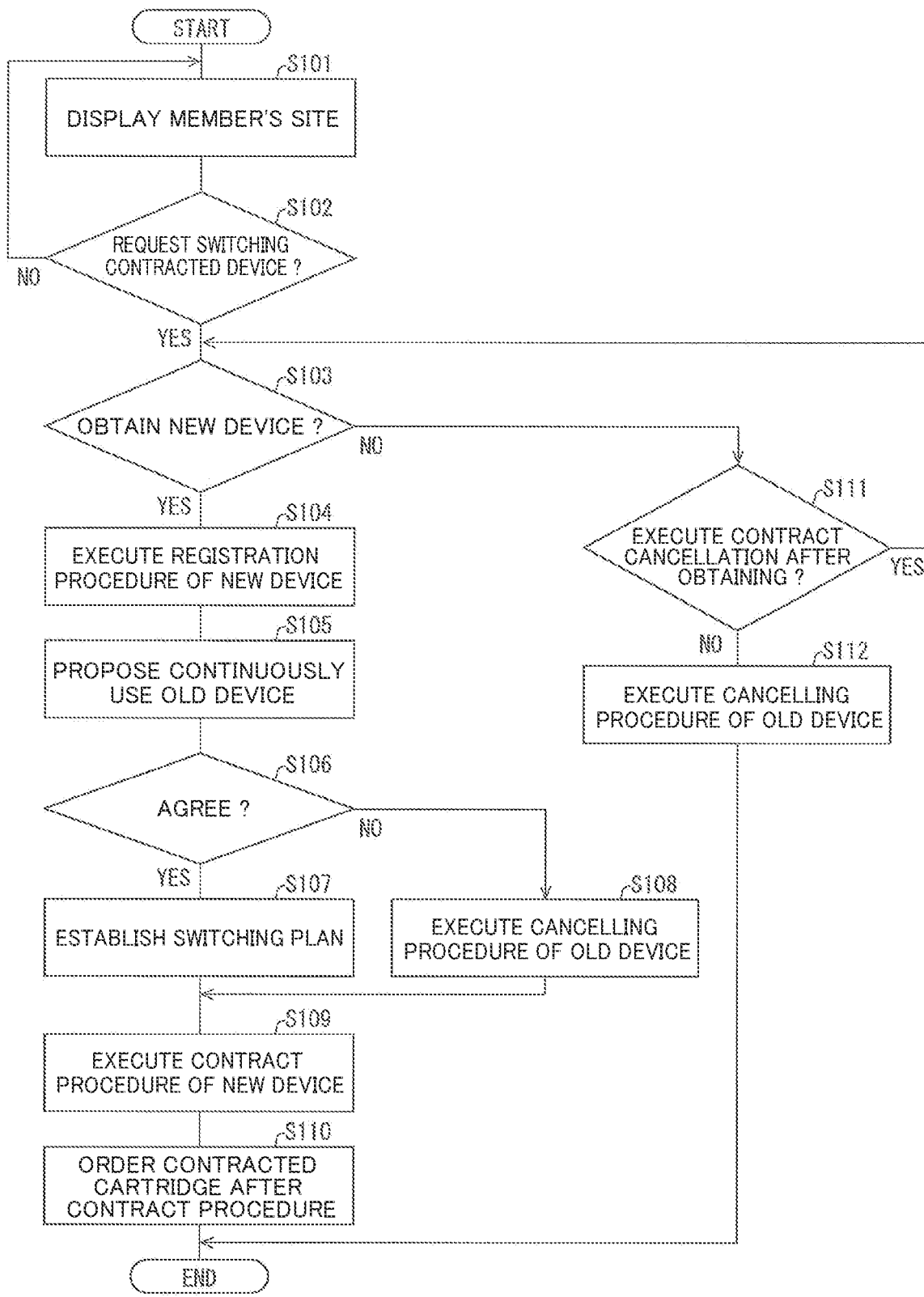
FIG. 5 is a flowchart illustrating a flow of a switching process of a contracted device executed by the image forming system according to a first embodiment.
Figure 6:
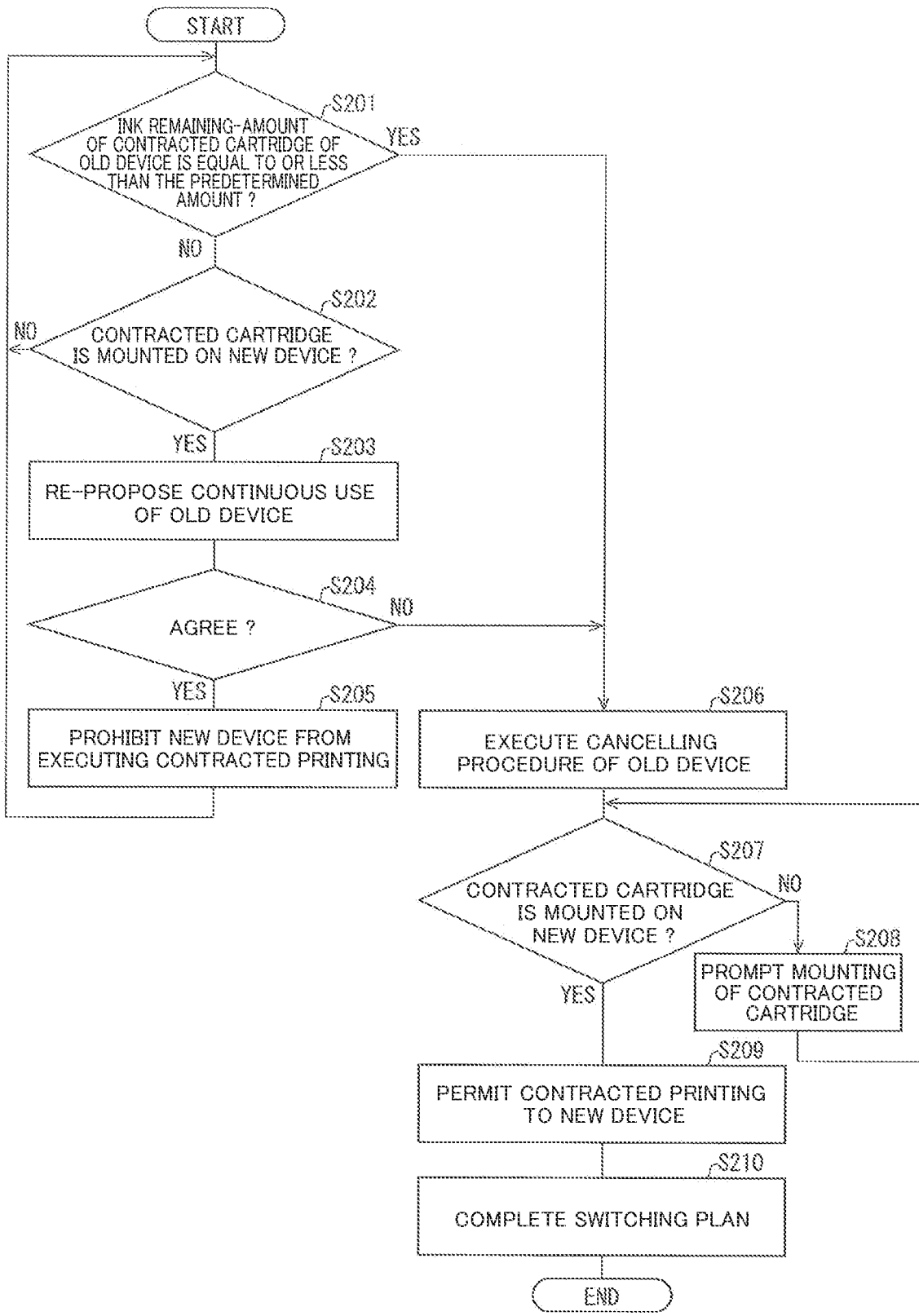
FIG. 6 a flowchart illustrating a flow of processes after a completion of a switching plan executed by the image forming system according to the first embodiment.
Figure 7:
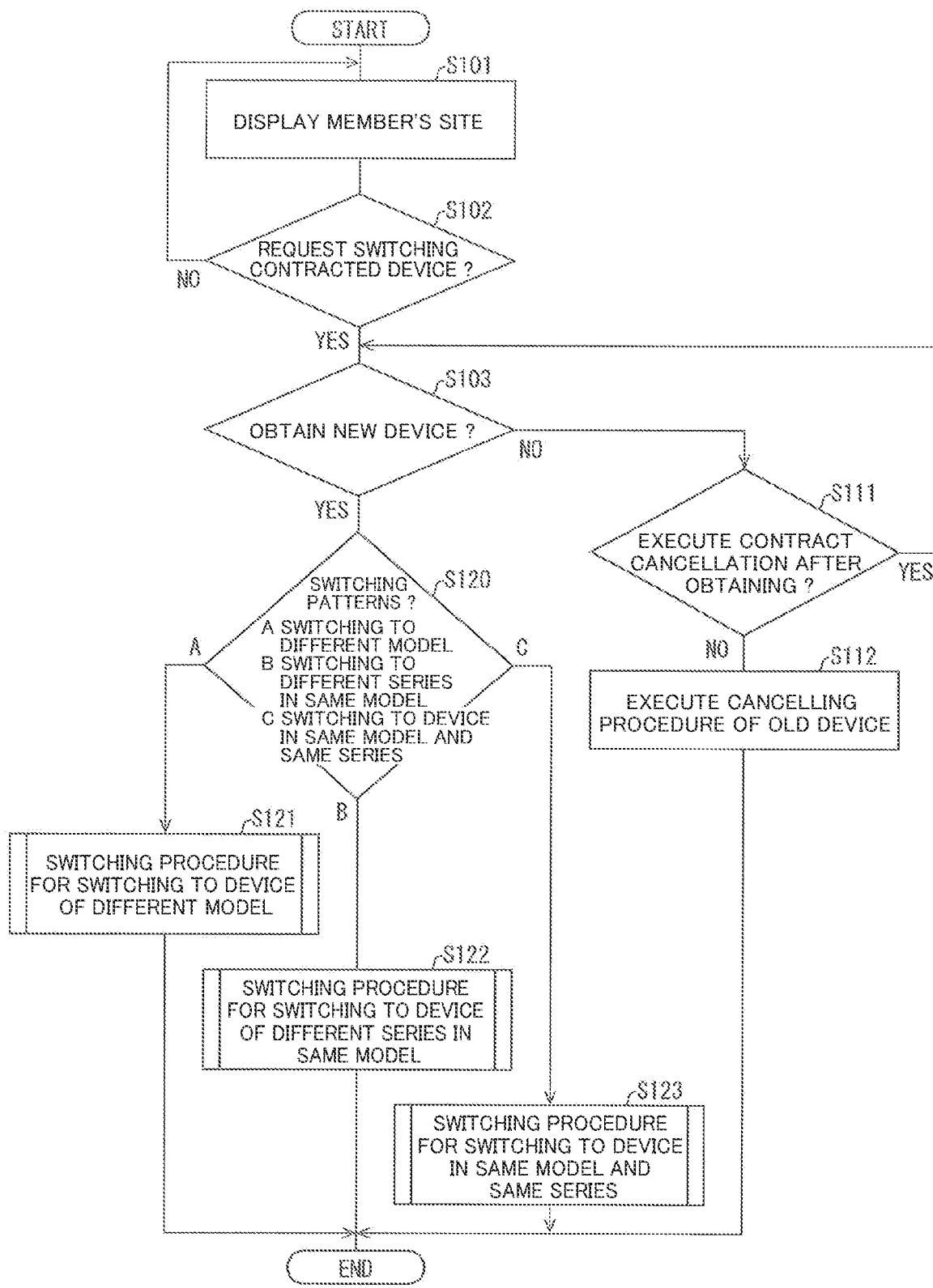
FIG. 7 is a flowchart illustrating a flow of a switching process of a contracted device executed by the image forming system according to a second embodiment.

FIG. 5 to FIG. 7 are flowcharts illustrating flows of processes for switching the contracted device executed by each of the apparatuses in the image forming system 100. In the present embodiment, as an example, when switching the contracted device, a switching plan is provided from the image forming system 100 to the user. The switching plan is a service in which the user can continuously use the contracted printing by using the pre-switched image forming apparatus 1 in a predetermined period from a timing when the user requests switching of the contracted device to a timing when the user can actually use the contracted printing by using the post-switched image forming apparatus 1. As an example, the switching plan is provided as follows. The switching plan may be provided only when the user requests the service, and may be automatically provided at the time of switching of the contracted device, regardless of the use's request.

In the following description, for easier understanding of the content of the present disclosure, there will be described and exemplified by specifying a subject which executes each of the processes illustrated in FIG. 5 to FIG. 7 to any of apparatuses constituting the image forming system 100. However, it should not be limitedly interrupted that each of the processes illustrated in FIG. 5 to FIG. 7 is executed by only the specified and exemplified apparatus. Each of the processes illustrated in FIG. 5 to FIG. 7 may be executed by another apparatus other than apparatuses exemplified below, and may be executed by a plurality of apparatuses which cooperate with each other. That is, an information processing apparatus that is the subject which executes each of the processes illustrated in FIG. 5 to FIG. 7 can be constituted by any one of, or combination of two or more of the pre-switched image forming apparatus 1, the post-switched image forming apparatus 1, the server 8, and the user terminal 9.

Processes Executed from before Establishment of Switching Plan to Just After Establishment of Switching Plan FIG. 5 is a flowchart illustrating a flow of processes executed by each of the apparatuses in the image forming system 100 and executed in a period extending from the timing before an establishment of the switching plan to the timing just after the establishment of the switching plan.

At step S101, the server controller 81 of the server 8 displays a member's site on a display, not illustrated, of the user terminal 9. The member's site includes a user interface (which will be referred to as a UI) for various procedures related to the contract which are performed by the user. The member's site includes, for example, a UI for a contract procedure for newly concluding the contract, a UI for a purchase procedure for purchasing the image forming apparatus, a UI for a cancelling procedure for cancelling the contract, and a UI for a registration procedure for newly registering the image forming apparatus with which the contract will be concluded.

As an example, the display of the member's site is executed by the following steps. The user terminal 9 accesses a URL (Uniform Resource Locator) of the member's site in accordance with the operation of the user. In response to an access request from the user terminal 9, the server controller 81 permits the user terminal 9 to access the member's site. The permitted user terminal 9 displays the member's site on the display which is not illustrated.

At step S102 (an accepting process), the server controller 81 accepts a request for switching the contracted device from the image forming apparatus 1 which is allowed to use the contracted cartridge based on the concluded contract to another image forming apparatus 1. The above described accepting process is, for example, executed by the following steps. The user terminal 9 receives the operation of the user for instructing switching the contracted device via the member's site which is being displayed. The user terminal 9 transmits a switching request for requesting switching the contracted device to the server 8. The server controller 81 can determine that the user requests switching the contracted device based on receipt of the switching request. When the server controller 81 receives the switching request, the flow goes from YES at S102 to S103.

At step S103, the server controller 81 determines whether the purchase procedure related to the post-switched image forming apparatus 1 has been completed, and the post-switched image forming apparatus 1 has been delivered to the user or not. As an example, the server controller 81 determines whether a purchase history and a shipping history related to the post-switched image forming apparatus 1 is stored in the server memory 82 by referring the server memory 82. When the server controller 81 determines that the post-switched image forming apparatus 1 has been delivered to the user based on the purchase history and the shipping history, the flow goes to from YES at S103 to S104. When the server controller 81 determines that the post-switched image forming apparatus 1 has not been delivered to the user, the flow goes to NO at S103 to S111.

At step S104, the server controller 81 executes the registration procedure related to the post-switched image forming apparatus 1. Specifically, the server controller 81 registers the device information of the post-switched image forming apparatus 1 which has been delivered to the user together with information of the contract flag "unidentified" into a database, which is not illustrated, stored in the server memory 82. As an example, the device information of the post-switched image forming apparatus 1 may be delivered from the user terminal 9.

At step S105 (a proposing process), the server controller 81 may propose the switching plan to the user. As an example, the server controller 81 may display, on the display of the user terminal 9, a message for proposing that the user continuously uses the pre-switched image forming apparatus 1 in a predetermined period until the pre-switched image forming apparatus 1 uses all ink in the contracted cartridge mounted on the pre-switched image forming apparatus 1. As an example, the user terminal 9 may display, on the display, a UI including a "YES" button indicating an agreement with the proposal and a "NO" button indicating a dismissal of the proposal, in addition to the above proposed message. When any of the buttons is operated, the user terminal 9 transmits, to the server 8, responding information indicating either "agreement" or "dismissal" regarding the proposal of the switching plan.

In another modification, the server controller 81 obtains the ink remaining-amount information 423 of the contracted cartridge mounted on the pre-switched image forming apparatus 1 from the image forming apparatus 1, and may determine whether the remaining amount of ink of the contracted cartridge is equal to or less than a predetermined amount or not. When the remaining amount of ink indicated by the ink remaining-amount information 423 is equal to or less than the predetermined amount, the flow may goes to S108 without executing S105.

At step S106, the server controller 81 determines whether the user agrees with the proposal of the switching plan, or dismisses the proposal of the switching plan based on the above described responding information. When the responding information received from the user terminal 9 indicates "agreement", the flow goes from YES at S106 to S107. When the responding information indicates "dismissal", the flow goes from NO at S106 to S108.

At step S107 (an enablement-continuing process), the server controller 81 establishes the switching plan. As an example, the server controller 81 instructs the pre-switched image forming apparatus 1 to maintain the contracted mode. The controller 61 of the pre-switched image forming apparatus 1 maintains the mode information 623 stored in the main memory 62 in the contracted mode. As a result, the pre-switched image forming apparatus 1 can execute the contracted printing in the predetermined period by continuously using the contracted cartridge which has been previously used.

At step S108 (a dis-enablement-establishing process), the server controller 81 executes the cancelling procedure for the pre-switched image forming apparatus 1 based on the fact of the dismissal of the proposal of the switching plan, or the fact that the remaining amount of ink of the contracted cartridge is equal to or less than the predetermined amount. As an example, the cancelling procedure is executed by the following steps. The server controller 81 transmits, to the pre-switched image forming apparatus 1, a contract-cancellation instruction. The controller 61 of the image forming apparatus 1 renews the mode information 623 of the main memory 62 so as to indicate the not-contracted mode switched from the contracted mode, and reports on a completion of switching to the not-contracted mode to the server 8. The server controller 81 renews the contract flag of the pre-switched image forming apparatus 1 stored in the server memory 82 so as to indicate "unidentified" switched from "identified" based on the report. Accordingly, the contracted printing by using the contracted cartridge is not executed in the pre-switched image forming apparatus 1.

At step S109 (an enablement-establishing process), the server controller 81 executes the contract procedure of the post-switched image forming apparatus 1. The contract procedure is, for example, executed by the following steps. The server controller 81 transmits the contract-switching-instruction to the post-switched image forming apparatus 1. The controller 61 of the post-switched image forming apparatus 1 renews the mode information 623 stored in the main memory 62 so as t indicate the contracted mode switched from the not-contracted mode based on the contract-switching-instruction. Then, the controller 61 transmits, to the server 8, a switching-completion-notification for notifying a completion of switching to the contracted mode. The server controller 81 receives the switching-completion-notification (a receiving process). The server controller 81 renews the contract flag of the post-switched image forming apparatus 1 registered in the server memory 82 so as to indicate "identified" switched from "unidentified" based on receipt of the switching-completion-notification. Accordingly, the contracted cartridge can be used in the post-switched image forming apparatus 1. In another modification, the enablement-establishing process at S109 may be executed after the process at S104 and before the enablement-continuing process at S107.

At step S110 (an ordering process), the server controller 81 orders a contracted cartridge which can be used in the post-switched image forming apparatus 1 in accordance with completion of the contract procedure in response to receipt of the switching-completion-notification. A receiver of the order may be, for example, an order-receiving server managed by a delivery center taking charge of orders of the contracted cartridges, and the like. The contracted cartridge is provided to the user of the post-switched image forming apparatus 1, triggered by the order executed by the server controller 81.

At step S111, the server controller 81 may inquire whether the user performs a contract-cancellation procedure of the pre-switched image forming apparatus 1, or not after arranging the post-switched image forming apparatus 1 for the user. For example, the server controller 81 may transmit, to the user terminal 9, the message of inquiring for performing the contract-cancellation procedure of the pre-switched image forming apparatus 1 after performing the purchase procedure of the post-switched image forming apparatus 1, and may display, on the display of the user terminal 9, the message of inquiring for performing the contract-cancellation procedure of the pre-switched image forming apparatus 1. Moreover, a UI including a "YES" button indicating that the contract is canceled after obtaining the post-switched image forming apparatus 1, and a "NO" button indicating that the contract is canceled without obtaining the post-switched image forming apparatus 1 in addition to the above described message on the display. The user terminal 9 transmits, to the server 8, responding information indicating any one of the "YES" button and the "NO" button has been selected by the user. When the server controller 81 receives the responding information indicating selection of the "YES" button, the flow returns from YES at S111 to S103. For example, when returning to S103, the user terminal 9 may display, on the display, a home page of the member's site or a purchasing screen of the post-switched image forming apparatus 1. When the server controller 81 receives the responding information indicating selection of the "NO" button, the flow goes from NO at S111 to S112.

At step S112 (an dis-enablement-establishing process), the server controller 81 performs the cancelling procedure of the pre-switched image forming apparatus 1 based on the instruction of cancelling the contract without obtaining the post-switched image forming apparatus 1. The cancelling procedure can be performed by the step that is the same as step S108.

Processes Executed After Establishment of Switching Plan

FIG. 6 is a flowchart illustrating a flow of processes executed by each of the apparatus in the image forming system 100 and executed after the establishment of the switching plan. As an example, the processes illustrated in FIG. 6 are started when the remaining amount of ink of the contracted cartridge mounted on the pre-switched image forming apparatus 1 becomes equal to or less than the predetermined amount, or when the contracted cartridge is mounted on the post-switched image forming apparatus 1. In another modification, the processes illustrated in FIG. 6 may be started when the above described remaining amount of ink becomes less than the predetermined amount.

At step S201 (a remaining-amount-determination process), the server controller 81 determines whether the remaining amount of ink of the contracted cartridge mounted on the pre-switched image forming apparatus 1 is equal to or less than the predetermined amount or not. For example, the server controller 81 can perform the determination of the remaining amount of ink by receiving the ink remaining-amount information 423 of the contracted cartridge from the pre-switched image forming apparatus 1. As an example, the server controller 81 may determine that the remaining amount of ink of the contracted cartridge "is equal to or equal to or less than the predetermined amount" in a case where the contracted cartridge is empty. In this case, the server controller 81 determines that "the remaining amount of ink is greater than the predetermined amount" without determining that "the remaining amount of ink is equal to or less than the predetermined amount", even if a small amount of ink exists in the contracted cartridge. When the server controller 81 determines that the remaining amount of ink is equal to or less than the predetermined amount, the flow goes from YES at S201 to S206. When the server controller 81 determines that the remaining amount of ink is greater than the predetermined amount, the flow goes from NO at S201 to S202.

It is noted that the determination of the remaining amount of ink may be executed by the controller 61 of the pre-switched image forming apparatus 1, and may be executed by the controller 61 of the post-switched image forming apparatus 1. The controller 61 of the post-switched image forming apparatus 1 can execute the determination of the remaining amount of ink of the pre-switched image forming apparatus 1 by receiving the ink remaining-amount information 423 of the pre-switched image forming apparatus 1 from the server controller 81.

At step S202 (a detecting process), the server controller 81 detects mounting of the contracted cartridge on the post-switched image forming apparatus 1. For example, the server controller 81 can detect the mounting of the contracted cartridge on the post-switched image forming apparatus 1 by receiving a notification indicating that the contracted cartridge is mounted on the post-switched image forming apparatus 1. The detection of the mounting may be executed by the controller 61 of the post-switched image forming apparatus 1. While the mounting of the contracted cartridge on the post-switched image forming apparatus 1 is not detected, the server controller 81 returns the process from NO at S202 to S201, and monitors the remaining amount of ink of the pre-switched image forming apparatus 1. When the server controller 81 detects the mounting of the contracted cartridge, the flow goes from YES at S202 to S203.

At step S203 (a re-proposing process), the server controller 81 may re-propose the switching plan to the user. That is, the server controller 81 may propose to the user again that the user continuously use the remaining ink in the pre-switched image forming apparatus 1. For example, the server controller 81 may transmit a message for the re-proposal to the post-switched image forming apparatus 1 or the user terminal 9, and may display the message on the display of the post-switched image forming apparatus 1 or the user terminal 9. A UI including a "YES" button indicating an agreement with the re-proposal and a "NO" button indicating a dismissal of the re-proposal may be displayed on the display in addition to the above described message. When any one of the "YES" button and the "NO" button is operated, the post-switched image forming apparatus 1 or the user terminal 9 transmits responding information indicating either "agreement" with the re-proposal of the switching plan or "dismissal" of the re-proposal to the server 8.

At step S204, the server controller 81 determines whether the user agrees with the re-proposal of the switching plan or the user dismisses the re-proposal based on the above described responding information. When the received responding information indicates "agreement", the flow goes from YES at S504 to S505. When the responding information indicates "dismissal", the flow goes from NO at S504 to S206.

At step S205 (a prohibiting process), the server controller 81 temporarily prohibits the post-switched image forming apparatus 1 from executing the contracted printing. For example, the server controller 81 instructs the post-switched image forming apparatus 1 not to execute printing by using the contracted cartridge even if the contracted cartridge is mounted on the post-switched image forming apparatus 1.

Accordingly, at the timing of S505, the normal printing executed by using the commercial cartridge and the contracted printing executed by using the contracted cartridge are executable in the pre-switched image forming apparatus 1. And, in the post-switched image forming apparatus 1, the normal printing executed by using the commercial cartridge is executable, however, the contracted printing executed by using the contracted cartridge is prohibited.

In another modification, the server controller 81 may further transmit, to the post-switched image forming apparatus 1, a message for prompting the user to pull out the contracted cartridge from the post-switched image forming apparatus 1. The controller 61 of the post-switched image forming apparatus 1 can prompt the user to pull out the contracted cartridge by displaying the above described message received from the server 8 on the display.

At step S206 (a dis-enablement-establishing process), the server controller 81 performs the cancelling procedure with respect to the pre-switched image forming apparatus 1 based on the dismissal of the re-proposal of the switching plan, or based on that fact that the remaining amount of ink of the contracted cartridge is equal to or less than the predetermined amount. The cancelling procedure may be executed, for example, by the step that is the same as S108.

At step S207, the server controller 81 determines whether the contracted cartridge is mounted on the post-switched image forming apparatus 1 or not. For example, the server controller 81 can determine whether the contracted cartridge is mounted on the post-switched image forming apparatus 1 by receiving a notification related to a mounting situation of the contracted cartridge from the post-switched image forming apparatus 1. The determination of mounting of the contracted cartridge on the post-switched image forming apparatus 1 may be executed by the controller 61 of the post-switched image forming apparatus 1. When the server controller 81 determines that the contracted cartridge is not mounted on the post-switched image forming apparatus 1, the flow goes from NO at S207 to S208. When the server controller 81 determines that the contracted cartridge is mounted on the post-switched image forming apparatus 1, the flow goes from YES at S207 to S209.

At step S208, the server controller 81 may transmit a message for prompting the user to mount the contracted cartridge on the post-switched image forming apparatus 1 to the post-switched image forming apparatus 1. The controller 61 of the post-switched image forming apparatus 1 can prompt the user to mount the contracted cartridge on the post-switched image forming apparatus 1 by displaying the above described message received from the server 8 on the display.

At step S209 (a permitting process), the server controller 81 permits the post-switched image forming apparatus 1 to execute the contracted printing. As an example, the permission of the contracted printing may be performed by the following steps. For example, the server controller 81 instructs the post-switched image forming apparatus 1 to switch from the above described non-billing status to the billing status. The controller 61 of the post-switched image forming apparatus 1 renews the mode information 623 stored in the main memory 62 so as to indicate the billing status switched from the non-billing status in accordance with the instruction. The controller 61 replies to the server 8 by a notification indicating completion of switching to the billing status.

At step S210, the server controller 81 completes the switching plan. As an example, the server controller 81 registers that the post-switched image forming apparatus 1 is switched to the billing status into a database stored in the server memory 82. Moreover, the server controller 81 may delete the device information of the pre-switched image forming apparatus 1 from the database.

Accordingly, at the timing of S210, the normal printing executed by using the commercial cartridge and the contracted printing executed by using the contracted cartridge are executable in the post-switched image forming apparatus 1. And, the normal printing executed by using the commercial cartridge is executable, however, the contracted printing executed by using the contracted cartridge is not executable in the pre-switched image forming apparatus 1.

Effects

According to the above described method, when the request for switching the contracted device from the old device to the new device from the user, use of all printing materials in the contracted cartridge mounted on the old device is prompted. Specifically, the registration procedure in which the new device is registered as the contracted device can proceed while the user is allowed to continuously use the contracted cartridge in the old device.

Specifically, the user can continuously use the old device in the predetermined period until the amount of the printing materials of the contracted cartridge becomes equal to or less than the predetermined amount. And, the arrangement in which the contracted printing becomes executable in the new device proceeds in the predetermined period. For example, the arrangement such as the delivery of a contracted cartridge to be used in the new device to the user is proceeded.

Accordingly, in a case where the arrangement of the contracted printing in the new device has been completed before the timing when the amount of the printing materials in the contracted cartridge mounted on the old device becomes equal to or less than the predetermined amount, it is possible to eliminate a period in which the user cannot execute the contracted printing, or reduce the period in which the user cannot execute the contracted printing, even when the amount of the printing materials becomes equal to or less than the predetermined amount before the timing when the arrangement has been completed. As a result, it is possible to improve the convenience to the user by eliminating or reducing the period in which the user cannot use the contracted service when switching from the old device to the new device.

Modifications of First Embodiment

In the above described method, according to another modification, when it is determined that the remaining amount of ink in the contracted cartridge is equal to or less than the predetermined amount at S201 (YES), the server controller 81 may identify whether the contracted cartridge is mounted on the post-switched image forming apparatus 1 or not. When it is identified that the contracted cartridge is not mounted on the post-switched image forming apparatus 1, the server controller 81 may immediately transmit, to the post-switched image forming apparatus 1, the message for prompting the user to mount the contracted cartridge on the post-switched image forming apparatus 1 at the timing of determination of YES at S201.

In the above described method, according to the other modification, the server controller 81 may transmit, to the pre-switched image forming apparatus 1, an advance notice of completion of the switching plan before the timing when the dis-enablement-establishing process is executed at S206. The advance notice of the completion of the switching plan includes a message for notifying, previous to the cancelling procedure, the user the fact that the user cannot use the contracted cartridge in the pre-switched image forming apparatus 1, that is, the user cannot execute the contracted printing.

Second Embodiment

The method for switching the contracted device described in the first embodiment in the present disclosure can be adopted to any of switching patterns such as switching devices between different models, switching devices between different series in the same model, and switching devices in the same series and in the same model.

"Switching devices between different models" indicates switching to a different type of an image forming apparatus having a different mechanism of printing, such as switching from an ink-jet printer to a laser printer.

"Switching devices between different series in the same model" indicates switching devices in the same model, and switching to an image forming apparatus in a different series having no compatibility of a cartridge due to differences of the shape or performance.

"Switching devices in the same series and in the same model" indicates switching devices in the same modes, and switching to an image forming apparatus of the same series having compatibility of a cartridge due to similar shape and performance.

Moreover, in the method for switching the contracted device in the present disclosure, a switching process including a series of processes of switching illustrated in FIG. 5, especially, processes of step S104 to S110 may be executed for each of the switching patterns.

FIG. 7 is a flowchart illustrating a flow executed by each of the apparatuses in the image forming system 100 and executed in a period extending from the timing before an establishment of the switching plan to the timing just after the establishment of the switching plan.

In the second embodiment, each of the processes of S101 to S103, S111, and S112 of the first embodiment is executed in the same manner. In the second embodiment, differences from the first embodiment are that the server controller 81 executes any one of processes of S121 to S123 after the flow goes from YES at S103 to S120.

At step S120, the server controller 81 determines the switching patterns. As described above, the switching patterns means the same model or differences models between the pre-switched image forming apparatus 1 and the post-switched image forming apparatus 1. In the following description, as an example, the server controller 81 determines "a pattern A" in a case of switching to a different model such as switching from an ink-jet printer to a laser printer. The server controller 81 determines "a pattern B" in a case of switching to a device in a different series having a different shape or performance in the same model. The server controller 81 determines "a pattern C" in case of switching to a device having compatibility of a cartridge and the like in the same series and in the same model.

The server controller 81 determines that the switching pattern is the pattern A when the pre-switched image forming apparatus 1 and the post-switched image forming apparatus 1 are different models from each other, the flow goes from A at S120 to S121. The server controller 81 determines that the switching pattern is the pattern B when the pre-switched image forming apparatus 1 and the post-switched image forming apparatus 1 are the same model and different series from each other, and the flow goes from B at S120 to S122. The server controller 81 determines that the switching pattern is the pattern C when the pre-switched image forming apparatus 1 and the post-switched image forming apparatus 1 are the same series and the same model, and the flow goes to C at S120 to S123.

It is noted that the server controller 81 may obtain information related to the model of the post-switched image forming apparatus 1 from the user terminal 9 at S120. The user can perform the purchase procedure of the post-switched image forming apparatus 1 via the member's site displayed on the user terminal 9. The user terminal 9 transmits, to the server 8, information indicating which model is selected as the post-switched image forming apparatus 1 by the user. The server controller 81 can specify the model of the post-switched image forming apparatus 1 based on the received information.

At step S121, each of the apparatuses in the image forming system 100 executes the switching process to switch the contracted device to a different model device. The switching process executed at S121 may be the same as each of processes executed at S104 to S110 in FIG. 5. Alternatively, the switching process executed at S121 may be the switching process in which a part of processes executed at S104 to S110 is changed or omitted, and other processes may be added to the processes executed at S104 to S110.

At step S122, each of the apparatuses in the image forming system 100 executes the switching process to switch the contracted device to the same model and different series device. The switching process executed at S122 may be the same as each of processes executed at S104 to S110 in FIG. 5. Alternatively, the switching process executed at S122 may be the switching process in which a part of processes executed at S104 to S110 is changed or omitted, and other processes may be added to the processes executed at S104 to S110.

At step S123, each of the apparatuses of the image forming system 100 executes the switching process to switch the contracted device to the same model and the same series device. The switching process executed at S123 may be the same as each of processes executed at S104 to S110 in FIG. 5. Alternatively, the switching process executed at S123 may be the switching process in which a part of processes executed at S104 to S110 is changed or omitted, and other processes may be added to the processes executed at S104 to S110.

The switching processes executed at S121, S122, and S123 may be the same as one another, or may be different from one another for the respective switching patterns determined at S120.

For example, when the switching pattern is the pattern C, switching of the model and the series of the image forming apparatus 1 is not requested by the user. According to this, the server controller 81 estimates that the user is satisfied with the specification of the old device, and the reason for switching is an urgent reason such as a breakdown of the old device, and may omit the proposing process executed at S105 for proposing the switching plan.

Alternatively, when the switching pattern is the pattern B, the server controller 81 estimates that the user wishes to obtain one with higher performance in the same model, and the urgency is relatively small. In this case, the server controller 81 may execute processes which recommend the user to use all of the consumables before or after the process at S105.

Alternatively, when the switching pattern is the pattern A, the server controller 81 may execute a inquiring process for inquiring whether the user wishes to urgently switch the contracted device or not before the process at S105. When the user replies that the user wishes the urgent switching, the server controller 81 may omit the proposing process at S105. When the user replies that the user does not wish the urgent switching, the server controller 81 may execute the proposing process at S105.

Modifications

The image forming apparatus 1 may be an apparatus having a function of executing printing by using consumables such as an ink cartridge or a toner cartridge and a function of communication. For example, the image forming apparatus 1 may be an ink-jet printer, or a laser printer. Alternatively, the image forming apparatus 1 may be a MFP (MultiFunction Peripheral) collectively having other functions such as a scanner function, and/or a facsimile function.

In a case where the image forming apparatus 1 is a laser printer, drum cartridges and toner cartridges, not the ink cartridge 4, are mounted on the image forming apparatus 1. It is noted that the number of the drum cartridges and the toner cartridges mounted on the image forming apparatus 1 is not limited to any number. Structures of the drum cartridges and the toner cartridges are not limited to any structures.

For example, the drum cartridges and the toner cartridges may be independent from each other. And, it may be configured that each the drum cartridges and each of the toner cartridges are integrated by mounting each of the toner cartridges on a corresponding one of the drum cartridges. Each of the toner cartridges is mounted on the body housing of the image forming apparatus 1 together with each of the drum cartridges while each of the toner cartridges is mounted on a corresponding one of the drum cartridges.

In a case where each of the drum cartridges and each of the toner cartridges are independent from each other, the structure of each of the drum cartridges and each of the toner cartridges may be any one of the following three types.

As a first modification, each of drum cartridges may include a cartridge housing, and a photoconductive drum, a drum memory, and a developing roller may be provided for the cartridge housing. Each of toner cartridges may include a cartridge housing, and a toner memory may be provided at the cartridge housing. The cartridge housing of each of the toner cartridges accommodates toner. An outer circumferential surface of the developing roller comes into contact with an outer circumferential surface of the photoconductive drum in each of the drum cartridges. As a result, developer, i.e., toner, is applied on the surface the photoconductive drum. Data indicated by a print job is printed by transferring the applied toner onto a recording sheet by a transfer belt.

As a second modification, each of a cartridge housing of each of drum cartridges may include a photoconductive drum and a drum memory. And, a developing roller may be provided at the cartridge housing of each of the toner cartridges. An outer circumferential surface of the developing roller comes into contact with an outer circumferential surface of the photoconductive drum in each of the drum cartridges.

As a third modification, each of developing cartridges having a developing roller may be mounted on the image forming apparatus 1, independently from each of drum cartridges and each of toner cartridges. In this case, each of the drum cartridges includes a cartridge housing, a photoconductive drum, and a drum memory. Each of the toner cartridges includes a cartridge housing and a toner memory. The cartridge housing of each of the toner cartridges accommodates toner. In the third modification, three parts, each of the drum cartridges, a corresponding one of the toner cartridges, and a corresponding one of the developing cartridges, are mounted on the body housing.

For example, a drum ID, drum type information, and drum-life-span information are stored in the drum memory. It is noted that the drum ID and the drum-life-span information are not essential information in the present disclosure. The drum type information is information indicating whether the drum cartridge is the drum cartridge dedicated to the contract, or the normal drum cartridge.

For example, a toner ID, and toner type information, and toner-life-span information are stored in the toner memory. It is noted that the toner ID and the toner-life-span information are not essential information in the present disclosure. The toner type information is information indicating whether the toner cartridge is the toner cartridge dedicated to the contract, or the normal toner cartridge.

In a case where the image forming apparatus 1 is a laser printer, the main memory 62 stores the drum information and the toner information, and does not store the ink information. The drum information is information associating the drum ID, the drum type information, and the drum-life-span information with one another each read from the drum memory of each of the drum cartridges. The toner information is information associating the toner ID, the toner type information, and the toner-life-span information with one another each read from the toner memory of each of the toner cartridges.

That is, it may be an integrated cartridge into which a drum cartridge and a toner cartridge are integrated. The integrated cartridge includes a cartridge housing, a photoconductive drum, a memory, and a developing roller. An outer circumferential surface of the developing roller comes into contact with an outer circumferential surface of the photoconductive drum in the integrated cartridge. The cartridge housing of the integrated cartridge accommodates toner. Various kinds of information stored in the above described drum memory and the toner memory are stored in the memory of the integrated cartridge.

In a case where the image forming apparatus 1 is a laser printer, the flow of processes illustrated in the flowcharts referred to the above described embodiment can be adopted. Specifically, in a case where the image forming apparatus 1 is a laser printer, the contracted cartridge that is the ink cartridge 4 described in the above described embodiment may be read as a drum cartridge and a toner cartridge (or an integrated cartridge).

It is noted that in a case where the image forming apparatus 1 is a laser printer, drum-life-span information and toner-life-span information are stored in the fifth area in the cartridge memory 42 of an integrated cartridge, in place of the ink remaining-amount information 423. In a case where a toner cartridge and a drum cartridge are not integrated, drum-life-span information is stored in the fifth area in the cartridge memory 42 of the drum cartridge, and toner-life-span information is stored in the fifth area in the cartridge memory 42 of the toner cartridge.

In the image forming apparatus 1 of the present modification, it is possible to achieve the same effects as achieved in the image forming apparatus 1 according to the above described embodiment 1.

Embodiment by Software

The control blocks of the image forming apparatus 1 and the server 8 may be embodied by logic circuits (hardware) formed on integrated circuits (IC chips) and the like, or may be embodied by software.

In the latter case, the image forming apparatus 1 and the server 8 includes a computer which executes instructions of programs that is software configured to embody various functions. The computer includes, for example, one or more processors, and a recording medium storing the programs readable by the computer. And, in the computer, an object of the present disclosure is achieved by reading the programs from the recording medium and executing the programs by the processor. For example, a CPU (Central Processing Unit) can be used as the processor. As the recording medium, a tangible non-transitory medium, for example, a ROM, a tape, a disk, a card, a semiconductor memory, a programmable logic circuit, and the like can be used Moreover, a RAM (Random Access Memory) which expands the program and the like may be used. Moreover, the programs may be provided to the computer via arbitrary transmission media capable of transmitting the programs (such as a communication network and a broadcast wave). It is noted that one embodiment of the present disclosure can be achieved as a form of data signals in which the programs are embodied and embedded in a carrier wave.

The present disclosure is not limited to the above described embodiments, and the disclosure may be otherwise embodied with various modifications without departing from the scope and spirit of the disclosure. Embodiments achieved by appropriately combining technical features disclosed in different embodiments can be included in the technical scope of the present disclosure.

What is claimed is:

1. A method, comprising:
   accepting, by an information processing apparatus, a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, and
   establishing, by the information processing apparatus, a first enabled state in which the second image forming apparatus is allowed to use a contracted consumables, in response to acceptance of the request by the information processing apparatus.

2. The method according to claim 1,
wherein the second image forming apparatus includes a second main memory storing mode information indicating whether the second image forming apparatus is in a contracted mode in which the second image forming apparatus is an image forming apparatus with which the contract was concluded or not, and wherein, in the establishing, the information processing apparatus is configured to renew the mode information such that the mode of the second image forming apparatus indicates the contracted mode to use the contracted consumables.

3. The method according to claim 2, further comprising:

receiving, by the information processing apparatus, a switch-completion notification indicating that the second image forming apparatus is switched to the contracted mode; and ordering, by the information processing apparatus, contracted consumables to be used in the second image forming apparatus, in response to receipt of the switch-completion notification by the information processing apparatus.

4. The method according to claim 1,
wherein the information processing apparatus is constituted by at least one of the first image forming apparatus, the second image forming apparatus, a serve communicating with the first image forming apparatus and the second image forming apparatus via a communication network, and a user terminal of a user of the first image forming apparatus and the second image forming apparatus, the user terminal communicating with the server via the communication network.

5. An information processing apparatus, comprising a controller,
wherein the controller is configured to execute:
accepting a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, and establishing a first enabled state in which the second image forming apparatus is allowed to use a contracted consumables, in response to acceptance of the request.

6. The information processing apparatus according to claim 5,
wherein the second image forming apparatus includes a second main memory storing mode information indicating whether the second image forming apparatus is in a contracted mode in which the second image forming apparatus is an image forming apparatus with which the contract was concluded or not, and wherein, in the establishing, the information processing apparatus is configured to renew the mode information such that the mode of the second image forming apparatus indicates the contracted mode to use the contracted consumables.

7. The information processing apparatus according to claim 6,
wherein the controller is configured to further execute:
receiving a switch-completion notification indicating that the second image forming apparatus is switched to the contracted mode; and ordering contracted consumables to be used in the second image forming apparatus, in response to receipt of the switch-completion notification by the information processing apparatus.

8. The information processing apparatus according to claim 5,
wherein the information processing apparatus is constituted by at least one of the first image forming apparatus, the second image forming apparatus, a server communicating with the first image forming apparatus and the second image forming apparatus via a communication network, and a user terminal of a user of the first image forming apparatus and the second image forming apparatus, the user terminal communicating with the server via the communication network.

9. A system, comprising;
a first image forming apparatus allowed as a contracted device to use contracted consumables accommodating printing materials based on a concluded contract;
a second image forming apparatus with which the contract is newly concluded;
a server configured to communicate with the first image forming apparatus and the second image forming apparatus via a communication network;
a user terminal of a user of the first image forming apparatus and the second image forming apparatus via the communication network; and
an information processing apparatus constituted by at least one of the first image forming apparatus, the second image forming apparatus, the server and the user terminal,
wherein the information processing apparatus is configured to execute:
accepting a request for switching a contracted device from a first image forming apparatus to a second image forming apparatus, the contracted device being an image forming apparatus allowed to use contracted consumables accommodating printing materials based on a contract, the first image forming apparatus being an image forming apparatus with which the contract was concluded, the second image forming apparatus being an image forming apparatus with which the contract is newly concluded, and establishing a first enabled state in which the second image forming apparatus is allowed to use a contracted consumables, in response to acceptance of the request by the information processing apparatus.

10. The system according to claim 9,
wherein the second image forming apparatus includes a second main memory storing mode information indicating whether the second image forming apparatus is in a contracted mode in which the second image forming apparatus is an image forming apparatus with which the contract was concluded or not, and wherein, in the establishing, the information processing apparatus is configured to renew the mode information such that the mode of the second image forming apparatus indicates the contracted mode to use the contracted consumables.

11. The system according to claim 10,
wherein the information processing apparatus is configured to further execute:
- receiving a switch-completion notification indicating that the second image forming apparatus is switched to the contracted mode; and
- ordering contracted consumables to be used in the second image forming apparatus, in response to receipt of the switch-completion notification by the information processing apparatus.

12. The system according to claim 9,
wherein the information processing apparatus is constituted by at least one of the first image forming apparatus, the second image forming apparatus, the server, and the user terminal.

\* \* \* \* \*